Jan. 9, 1968

D. M. BOSTWICK 3,362,596

PACK BOX ASSEMBLY FOR MOTORCYCLES

Filed April 22, 1966

Deward M. Bostwick
INVENTOR.

Jan. 9, 1968  D. M. BOSTWICK  3,362,596
PACK BOX ASSEMBLY FOR MOTORCYCLES
Filed April 22, 1966  2 Sheets-Sheet 2
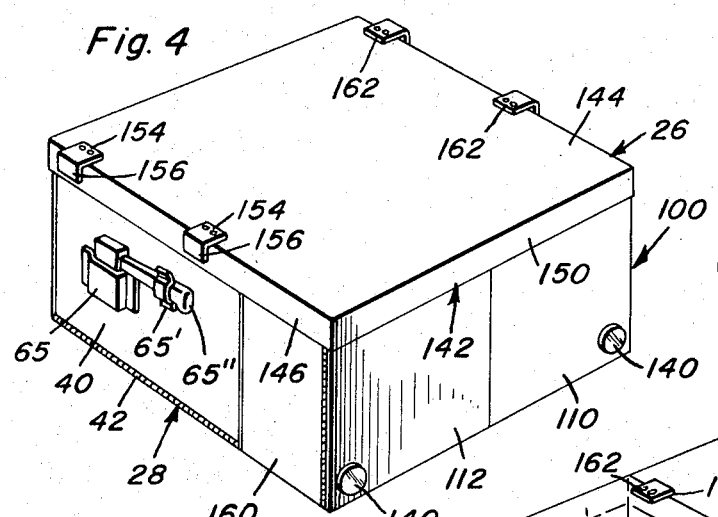
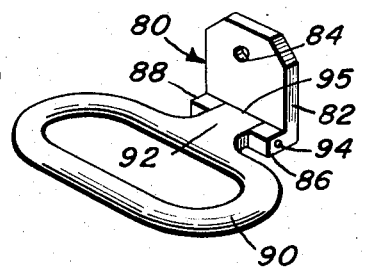
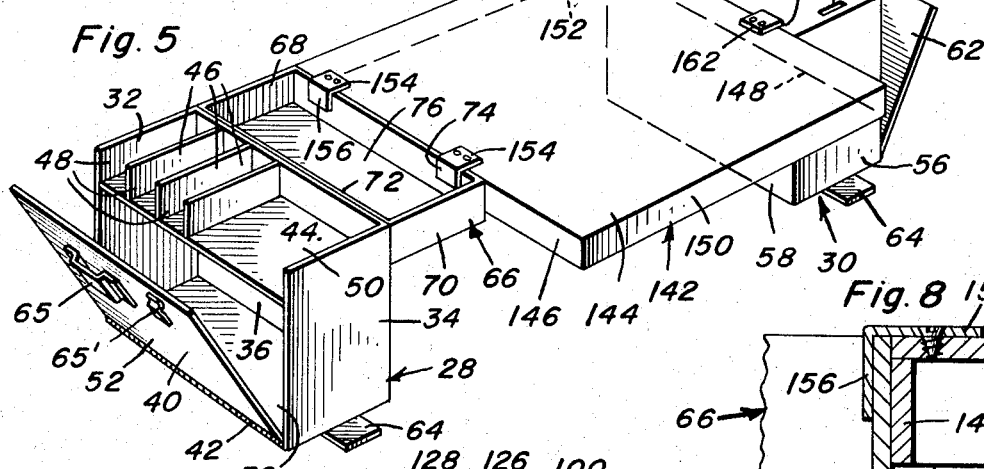
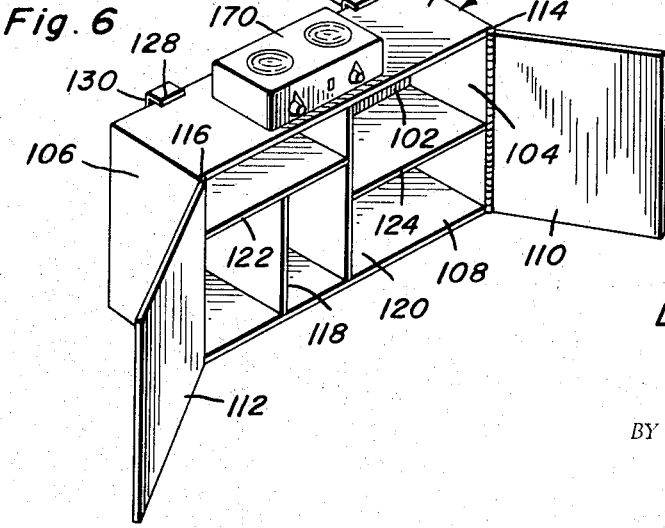
Deward M. Bostwick
INVENTOR.

United States Patent Office 3,362,596
Patented Jan. 9, 1968

3,362,596
PACK BOX ASSEMBLY FOR MOTORCYCLES
Deward M. Bostwick, 9429 S. Meade Ave.,
Oaklawn, Ill. 60453
Filed Apr. 22, 1966, Ser. No. 544,577
8 Claims. (Cl. 224—31)

ABSTRACT OF THE DISCLOSURE

A multiunit housing construction including separable rear and opposite side units adapted for support from the rear portion of a motorcycle or motor bike and the like with the rear unit disposed rearwardly of the rear fender and the opposite side units disposed on opposite sides of the rear wheel with the rear ends of the opposite side units abutting the forwardly facing surfaces of the opposite side portions of the rear unit, the associated motorcycle including means supporting the opposite side units from beneath their bottom walls and the rear unit being removably supported from the rear ends of the opposite side units with an inverted tray-like cover telescoped over the upper end portions of the rear and opposite side units.

This invention relates to a novel and useful housing structure and more specifically to a housing structure including a pair of upstanding opposite side horizontally spaced housing sections adapted to be supported from opposite sides of the rear portion of a frame of a two-wheeled vehicle on opposite sides of the rear wheel thereof. Further, this invention includes pack box portions which may also be supported from the support disclosed in my prior U.S. Patent No. 3,220,623 dated Nov. 30, 1965.

The housing structure of the instant invention is designed primarily for use on motorcycles but it is to be understood that the invention may also be utilized to advantage on bicycles and motor scooters, etc.

The housing structure includes support means adapted for securement to the frame of the motorcycle on opposite sides of the rear wheel thereof and the support means are adapted to removably support the lower end portions of the opposite side housing sections from the frame of the motorcycle. Means is provided and interconnected between the upper end portions of the housing sections and extends over the rear wheel of the motorcycle for preventing lateral outward movement of the upper ends of the sections relative to the motorcycle and each other. Still further, the housing structure of the instant invention includes a third rear upstanding housing section for disposition behind the rear wheel of the associated motorcycle. The rear housing section is horizontally elongated and the opposite ends thereof are adapted to be disposed immediately behind the rear ends of the side sections in juxtaposition thereto, the rear section and the side sections of the housing structure including coacting means removably supporting the rear section from the rear ends of the side sections. Thus, a two wheeled vehicle with which the assembly of the instant invention is operatively associated may be provided with ample enclosed areas in which suitable camping equipment and materials may be housed.

The assembly of the instant invention also includes a generally horizontal and panel-like member including downwardly directed flange portions extending along remote marginal edge portions thereof. The panel member is adapted to be removably secured over the upper ends of the side sections of the assembly when the side sections are supported from the associated vehicle with the opposite side depending flange portions of the panel-like member embracingly receiving the remote surfaces of the side sections therebetween. Further, the panel-like member is of dimensions to also overlie the upper end of the rear housing section and includes additional front and rear depending flange portions extending along the front and rear marginal edge portions thereof which embracingly receive therebetween the front and rear surface portions of the opposite side housing sections adjacent the upper ends thereof.

Still further, the adjacent marginal portions of the upper ends of the side sections and the above mentioned opposite marginal portions of the panel-like member include coacting means operative to releasably support the panel-like member from the adjacent portions of the upper end portions of the side sections when the latter are removed from the vehicle and spaced apart a distance approximately equal to the distance between the remote or marginal edge portions of the panel-like member. Accordingly, it may be seen wherein the upstanding side sections of the housing structure may be utilized as support legs for the opposite side marginal edge portions of the aforementioned panel-like members in order to form a table in conjunction with the latter.

The main object of this invention is to provide a pack box assembly for two-wheeled vehicles including portions thereof adapted to be supported from opposite side portions of the rear end of the two-wheeled vehicle frame without effecting the balance of the two-wheeled vehicle.

Yet another object of this invention is to provide a pack box assembly in accordance with the preceding object whose opposite side sections are adapted to be disposed on opposite sides of the rear wheel of the two-wheeled vehicle and which includes a third rear section adapted to extend behind the rear wheel of the associated two-wheeled vehicle and be supported from the rear ends of the opposite side sections of the assembly or structure.

Still another object of this invention is to provide a pack box assembly for two-wheeled vehicles which may be readily constructed so as to be adapted to be securable to substantially all types of two-wheeled vehicles including motorcycles, bicycles and motor scooters, etc.

A final object of this invention to be specifically enumerated herein is to provide a pack box assembly for two-wheeled vehicles which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of the assembled housing sections of the assembly shown with the panel-like top member secured thereover;

FIGURE 5 is a perspective view of the pack box assembly shown with the panel-like top or cover therefor secured between the opposite side of the housing section of the assembly when the side sections are spaced apart so as to coact with the panel-like top to form a table;

FIGURE 6 is a perspective view of the rear section of the housing structure;

Figure 1:
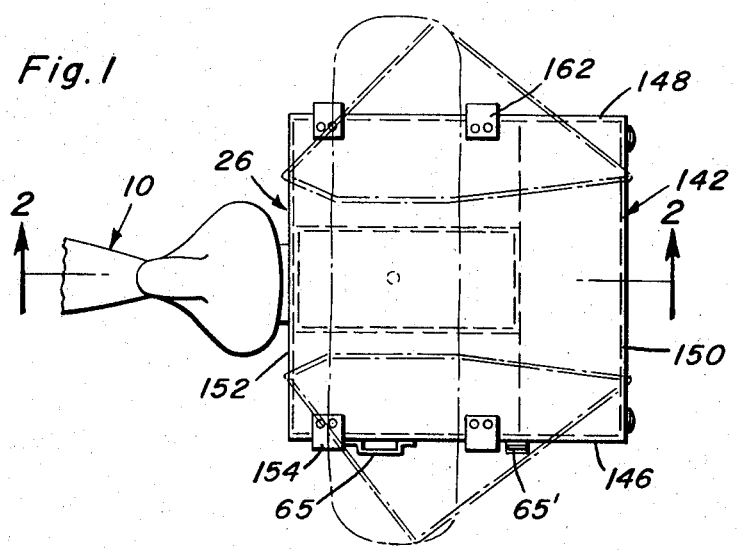
FIGURE 1 is a top plan view of the rear portion of a motorcycle shown with the pack box assembly of the instant invention operatively associated therewith.

FIGURE 7 is a perspective view of one of the support members adapted for securement to the motorcycle frame and to be utilized in supporting the opposite side housing sections on the lower end portions; and FIGURE 8 is an enlarged fragmentary vertical sectional view taken substantially upon a plane passing through the L-shaped bracket members by which the left-hand edge portion of the center panel-like section illustrated in FIGURE 5 is secured to the horizontally projecting portion of the side housing section illustrated at the left of FIGURE 5.

Referring now more specifically to the drawings, the numeral 10 generally designates a conventional form of motorcycle including a main frame 12 with a bifurcated rear end portion 14 between whose furcations 16 an axle assembly 18 is secured on which the rear wheel 20 of the motorcycle 10 is journalled. The motorcycle 10 also includes a rear fender 22 which is supported from the frame 12 and extends over the rear wheel 20. The rear fender 22 has an opening 24 formed in its upper portion over the center of the wheel 20.

The pack box assembly of the instant invention is generally referred to by the reference numeral 26 and includes a pair of opposite side housing structure sections generally referred to by the reference numerals 28 and 30. The section 28 includes front and rear walls 32 and 34, an inner side wall 36, a bottom wall 38 and an outer side wall 40 which is secured to the outer longitudinal marginal edge portion of the bottom wall 38 by means of a piano hinge structure 42. A shelf 44 is secured between the front and rear walls 32 and 34 and is provided with a plurality of upstanding partitions 46 defining a plurality of individual open top compartments 48 and 50 above the shelf 44 which may be utilized to receive various types of outdoor cooking equipment such as knives, forks, spoons and plates. The area disposed beneath the shelf 44 is designated by the reference numeral 52 and may be utilized to receive other cooking utensils such as pots and pans.

The section 30 includes front and rear walls or panels 54 and 56, an inner side wall 58, a top wall 60 and an outer hinged side wall 62 corresponding to the side wall 40 and also hingedly supported from a bottom wall (not shown) of the section 30 extending between the front and rear walls 54 and 56 and corresponding to the bottom wall 38. In addition, each of the sections 28 and 30 includes a horizontally disposed and rearwardly projecting support flange 64 secured to the rear portion of the undersurface of the corresponding bottom wall in any convenient manner. Further, a bracket 65 and spring clamp 65' are carried by the outer surface of the outer side wall 40 for removably supporting therefrom a hatchet 65" in a manner which is believed obvious, and a similar bracket and clamp assembly (not shown) can be provided for the side wall 62 for removably supporting a shovel from the section 30.

The section 28 also includes an upwardly opening tray-like structure generally referred to by the reference numeral 66 and including front and rear walls 68 and 70, opposite side walls 72 and 74, and a bottom wall 76. The side wall 72 of the structure 66 is secured to the outer surface of the upper marginal edge portion of the inner side wall 36 of the section 28 in any convenient manner and the upper edge portions of the walls 32, 34, 36, 40, 68, 70, 72 and 74 are substantially coplanar.

A pair of commercially available support brackets generally referred to by the reference numerals 80 are provided and include upstanding flange portions 82 apertured as at 84 and terminating at their lower ends in pairs of laterally outwardly directed arms 86 and 88. A support ring 90 is provided for each support bracket 80 and includes a laterally outwardly directed neck portion 92 on one side thereof which is pivotally secured between the corresponding pair of arm portions 86 and 88 by means of a pivot pin 94 extending through the arm portions 86 and 88 and rotatably received through the free end portion of the neck portion 92. The lower end of the flange portion 82 of each support bracket 80 is provided with a downwardly opening notch 95 intermediate the arms 86 and 88 and the neck portion 92 of the associated support ring 90 projects past the associated pin 94 and abuts against the uppermost extremity of the notch 95 to limit outward swinging movement of the support ring 90 to a position with the support ring 90 substantially horizontally disposed as illustrated in FIGURE 7 of the drawings. In addition the free end of each support ring 90 may be swung upwardly and toward corresponding flange portion 82 in order that the support ring 90 may be stored in a substantially vertically disposed position immediately along the outer surface of the corresponding flange portion 82. Further, each of the support brackets 80 is secured to the corresponding end of the axle 18 by means of a suitable threaded fastener 96 secured to the corresponding end of the axle assembly 18 projecting through each opening or aperture 84.

When the support rings 90 are in the horizontally disposed position illustrated in FIGURE 7 of the drawings, the sections 28 and 30 may have their lower ends supported therefrom. In addition, a third or rear housing section generally referred to by the reference numeral 100 is provided and includes a front wall 102, a pair of opposite side walls 104 and 106, a bottom wall 108 and a pair of hingedly supported rear wall sections or doors 110 and 122 suitably hingedly supported from the upstanding rear marginal edge portions of the side walls 104 and 106 by means of hinge assemblies 114 and 116. In addition, a plurality of upstanding dividers 118 and 120 and horizontal dividers 122 and 124 are secured in the rear section 100 to form a plurality of individual compartments therein.

The rear section 100 additionally includes a top wall 126 from whose forward marginal edge portion a plurality of L-shaped support brackets including depending outwardly spaced flange portions 130 project. The rear end of the top wall 60 of the section 30 includes a slot 132 for receiving the depending flange portion on the right hand end of the rear section 100 as seen in FIGURE 6 of the drawings and the depending flange portion 130 on the left hand side of the section 100 illustrated in FIGURE 6 is adapted to be engaged over the upper edge portion of the rear wall 34 centrally intermediate its opposite side edges. Thus, with the sections 28 and 30 supported from the support brackets 80 and the outer surface of the side wall 74 abutted against the outer surface of the side wall 58, the rear section 100 may be supported from the flanges or flange portions 64 projecting rearwardly of the sections 28 and 30 and the depending flange portions 130 may be passed through the slot 132 and lapped over the central portion of the upper marginal edge portion of the rear wall 34 so as to secure the rear section 100 with its opposite ends disposed in juxtaposition to the rear ends of the side sections 28 and 30. Of course, the outer surfaces of the rear wall sections or doors 110 and 112 may be provided with suitable light reflectors 140.

With reference more specifically to FIGURE 5 of the drawings there may be seen a top structure generally referred to by the reference numeral 142 which includes a generally panel-like member 144 including depending marginal edge flanges 146, 148, 150 and 152. The side of the panel-like member 144 adjacent the depending flange 146 has a plurality of L-shaped brackets 154 secured thereto in any convenient manner and including depending flange portions 156 corresponding to the depending flange portions 130 and which may be hooked over corresponding upper marginal edge portions of the side walls 74 of the tray-like structure 66. In addition, the top wall 66 further includes a pair of slots 160 formed therethrough and extending along the top wall 60 adjacent the inner side wall 58 and in which a pair of depending flange portions (not shown) of a pair of L-shaped brackets 162 corresponding to the brackets 154 are received. Of course, it may be noted that in FIGURE 5 of the drawings the sections 28 and 30 have been removed from the motorcycle 10 and are spaced further apart than when they are supported from the motorcycle 10. When the sections 28 and 30 are removed from the motorcycle 10 and the top section 142 is supported from the sections 28 and 30 as illustrated in FIGURE 5 of the drawings, a table-like structure is provided. Further, when the sections 28 and 30 as well as the section 100 are supported from the motorcycle in the manner previously described, the top structure 142 closely overlies the upper ends of the structures 28, 30 and 100 as well as the structure 66 and the depending flange portions 146, 148, 150 and 152 of the top structure 142 embracingly receive therebetween the remote sides of the sections 28 and 30 and the rear of the section 100 and the front portions of the sections 28, 30 and 66.

Figure 2:
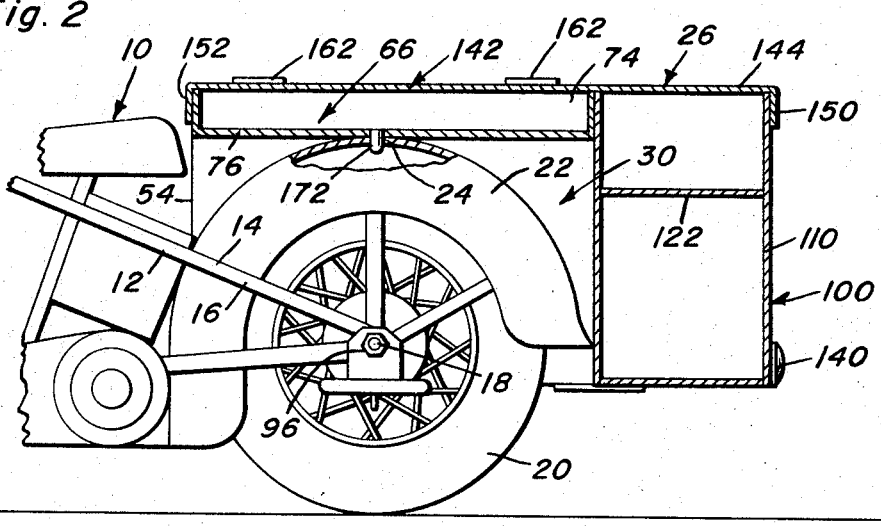
FIGURE 2 is a fragmentary enlarged longitudinal vertical sectional view taken substantially upon a plane indicated by section line 2—2 of FIGURE 1.
Figure 3:
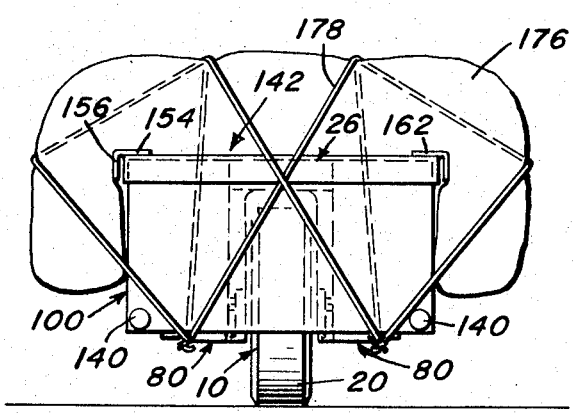
FIGURE 3 is a rear elevational view of the assemblage illustrated in FIGURES 1 and 2.

Of course, any suitable material may be disposed within the sections 28 and 30 and the section 100. When the sections 28 and 30 are removed from the motorcycle to form a table with the top structure 142, the top of the section 100 may be utilized as an area upon which to cook and prepare food, a suitable outdoor stove 170 being readily receivable within one of the compartments forms in the section 100. Still further, it may be seen from FIGURE 2 of the drawings that the bottom wall 76 of the section 66 includes a depending pin 172 which projects downwardly through the opening 24 formed in the center of the fender 22 and that the bottom wall 76 of the section 66 rests upon the upper surface of the center portion of the fender 22. Still further, any suitable camping equipment such as a tent or sleeping bag and the like may be suitably folded and secured over the assembled structure 26 in the form of a bundle 176 tied to the complete structure 26 by means of suitable length of rope 178 or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a two-wheeled vehicle of the type including longitudinally extending frame means from which a rear wheel is journalled, a housing structure comprising a pair of separable upstanding box-like opposite side housing sections disposed on opposite sides of said rear wheel, means carried by said frame removably independently supporting the lower end portions of said housing sections from said frame, and a generally horizontal and panel-like member including downwardly directed flange portions extending along remote marginal edge portions thereof, said panel-like member removably telescoped downwardly over and overlying the upper ends of said sections with said flange portions embracingly receiving the remote surfaces of only the upper end portions of said sections therebetween and terminating downwardly at an elevation spaced appreciably above the lower ends of said housing sections.

2. In combination with a two-wheeled vehicle of the type including longitudinally extending frame means from which a rear wheel is journalled, a housing structure comprising a pair of upstanding opposite side housing sections disposed on opposite sides of said rear wheel, means carried by said frame removably supporting the lower end portions of said housing sections from said frame, and means interconnecting the upper end portions of said sections, extending over and above said rear wheel, and preventing lateral outward movement of the upper ends of said sections relative to said vehicle and each other, said means including a generally horizontal and panel-like member including downwardly directed flange portions extending along remote marginal edge portions thereof, said panel-like member removably overlying upper ends of said sections with said flange portions embracingly receiving the remote surfaces of said sections therebetween, said remote edge portions of said panel-like member and the adjacent portions of the upper end portions of said sections including coacting means operative to releasably support said panel-like member from said adjacent portions of the upper end portions of said sections when the sections are removed from said vehicle and spaced apart a distance approximately equal to the distance between said remote marginal edge portions of said panel-like member.

3. In combination with a two-wheeled vehicle of the type including longitudinally extending frame means from which a rear wheel is journalled, a housing structure comprising a pair of upstanding box-like opposite side housing sections disposed on opposite sides of said rear wheel, means carried by said frame removably supporting the lower end portions of said housing sections from said frame, and means interconnecting the upper end portions of said sections, extending over and above said rear wheel, and preventing lateral outward movement of the upper ends of said sections relative to said vehicle and each other, a horizontally elongated third rear upstanding box-like housing structure section for disposition behind said rear wheel and the rear ends of said side housing sections when the latter are supported from said frame and with said opposite end portions of said third section disposed in juxtaposition to the rear ends of said side housing sections, said rear section and said side sections including coacting means removably supporting said rear section from said side sections.

4. The combination of claim 3 wherein said coacting means carried by said rear and side sections also includes means preventing lateral outward movement of the upper ends of said side sections relative to said vehicle and each other.

5. In combination with a two-wheeled vehicle of the type including longitudinally extending frame means from which a rear wheel is journalled, a housing structure comprising a pair of box-like upstanding opposite side housing sections disposed on opposite sides of said rear wheel, means carried by said frame removably supporting the lower end portions of said housing sections from said frame, a box-like horizontally elongated third rear upstanding housing structure section for disposition behind said rear wheel and the rear ends of said side housing sections when the latter are supported from said frame and with said opposite end portions of said third section disposed in juxtaposition to the rear ends of said side housing sections, said rear section and said side sections including coacting means removably supporting said rear section from said side sections, and a generally horizontal panel-like member of a plan size and shape positionable over the upper ends of said rear and side sections.

6. The combination of claim 5 wherein said panel-like member includes depending opposite side flange portions between which the upper portions of the remote sides of said side sections are received.

7. The combination of claim 6 wherein said panel-like member includes depending front and rear flange portions between which the upper portions of the front ends of said side sections and the rear of said rear section are received.

8. The combination of claim 6 wherein said depending opposite side flange portions closely embracing therebetween and preventing lateral outward movement of the upper ends of said side sections relative to said vehicle and each other.

References Cited

UNITED STATES PATENTS

| | | | |
|---|---|---|---|
| 600,364 | 3/1898 | Hill | 224—32 |
| 2,890,819 | 6/1959 | Glenny | 224—32 |

FOREIGN PATENTS

| | | |
|---|---|---|
| 1,158,664 | 1/1958 | France. |
| 2,054 | 5/1910 | Great Britain. |
| 183,595 | 7/1922 | Great Britain. |

GERALD M. FORLENZA, *Primary Examiner.*

F. W. WERNER, *Assistant Examiner.*